(12) United States Patent
Yang et al.

(10) Patent No.: US 11,984,846 B2
(45) Date of Patent: May 14, 2024

(54) SOLAR ENERGY POWER CONVERSION SYSTEM

(71) Applicant: NDSU Research Foundation, Fargo, ND (US)

(72) Inventors: Mijia Yang, Fargo, ND (US); Dong Cao, Fargo, ND (US); Yao Yu, Fargo, ND (US)

(73) Assignee: NDSU Research Foundation, Fargo, ND (US)

( * ) Notice: Subject to any disclaimer, the term of this patent is extended or adjusted under 35 U.S.C. 154(b) by 0 days.

(21) Appl. No.: 17/834,790

(22) Filed: Jun. 7, 2022

(65) Prior Publication Data

US 2022/0393641 A1    Dec. 8, 2022

Related U.S. Application Data

(60) Provisional application No. 63/197,727, filed on Jun. 7, 2021.

(51) Int. Cl.
| | |
|---|---|
| *H02S 40/32* | (2014.01) |
| *H02M 7/537* | (2006.01) |
| *H02S 20/21* | (2014.01) |
| *H02S 40/36* | (2014.01) |

(52) U.S. Cl.
CPC ............. *H02S 40/32* (2014.12); *H02M 7/537* (2013.01); *H02S 20/21* (2014.12); *H02S 40/36* (2014.12)

(58) Field of Classification Search
CPC ....... H01L 31/00–078; Y02E 10/50–60; H02S 40/30–38; H02J 2300/22–26; H02J 3/383–385
USPC ................................................. 136/243–265
See application file for complete search history.

(56) References Cited

U.S. PATENT DOCUMENTS

| | | | |
|---|---|---|---|
| 2013/0181529 A1* | 7/2013 | Tang ................. | H02M 7/53871 307/82 |
| 2014/0169053 A1* | 6/2014 | Ilic ............................ | H02J 3/40 363/132 |
| 2019/0149086 A1* | 5/2019 | Jin .......................... | H02J 3/388 136/244 |

FOREIGN PATENT DOCUMENTS

| | | |
|---|---|---|
| CN | 104883085 A | * 9/2015 |
| KR | 20100114279 A | * 10/2010 |

OTHER PUBLICATIONS

KR-20100114279-A English (Year: 2010).*
CN-104883085-A English (Year: 2015).*
(Continued)

*Primary Examiner* — Bach T Dinh
(74) *Attorney, Agent, or Firm* — MUETING RAASCH GROUP

(57) ABSTRACT

A power conversion circuit is used in a solar array suitable for, e.g., roadside adjacent installation. The power conversion circuit includes an inverter with a first stage electrically coupled to one or more solar panels. A third stage of the circuit has a DC to AC converter that provides less than a 50 VAC load voltage to a load, and a second stage that is coupled between the first and third stages and provides an isolated electrical power coupling therebetween. A sync interface communicatively couples a controller to other controllers dedicated to one or more other respective inverters of the solar array via a sync signal. The controllers synchronize the third stages of the inverters via the sync signal. The third stages of the inverters are coupled in series to provide a load output voltage.

19 Claims, 19 Drawing Sheets

(56) References Cited

OTHER PUBLICATIONS

Mishra, "A review on solid-state transformer: A breakthrough technology for future smart distribution grids," Dec. 2021, *International Journal of Electrical Power & Energy Systems*, vol. 133, 15 pages.

* cited by examiner

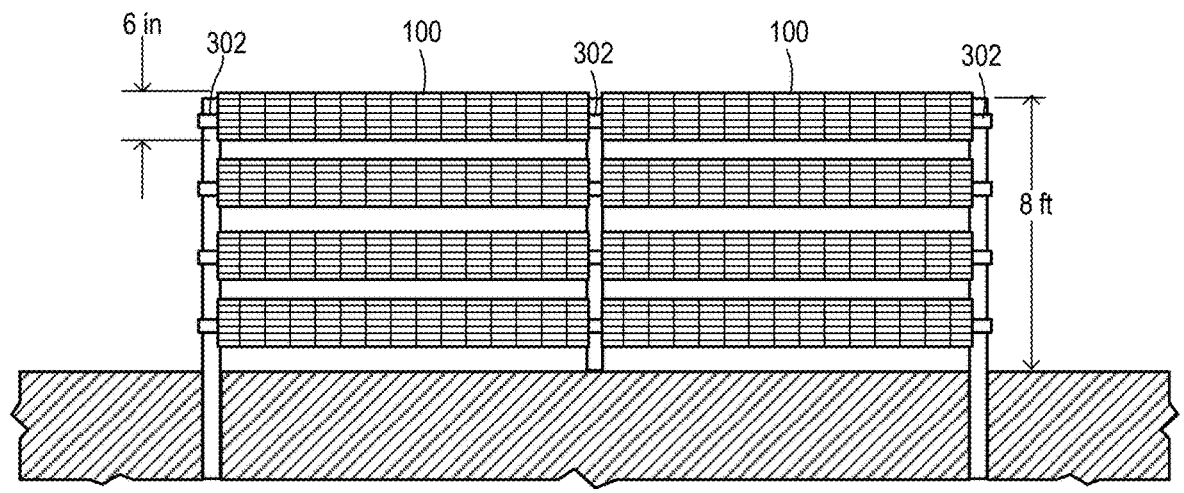
FIG. 5
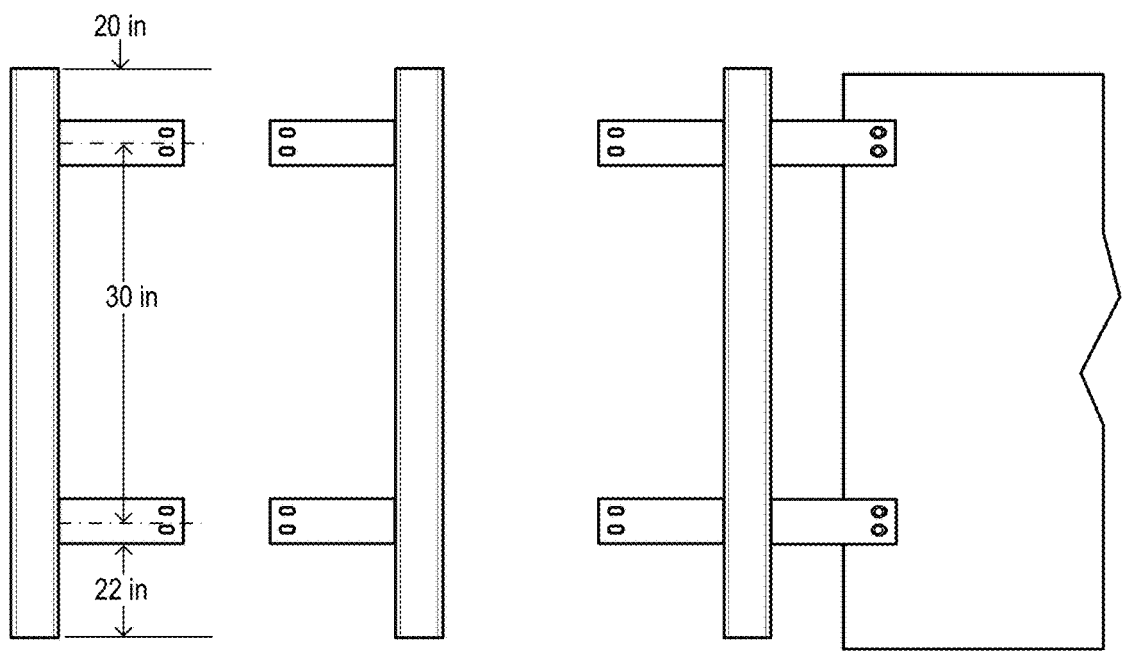
FIG. 6
FIG. 7

SOLAR ENERGY POWER CONVERSION SYSTEM

RELATED PATENT DOCUMENTS

This application claims the benefit of U.S. Provisional Application No. 63/197,727, filed on Jun. 7, 2021, which is incorporated herein by reference in its entirety.

SUMMARY

The present disclosure is directed to a solar energy power conversion system suitable for installation on roadside adjacent structures such as noise barriers and snow fencing. In one embodiment, a power conversion circuit includes an inverter having a first stage electrically coupled to one or more solar panels and performing a DC-to-DC conversion that provides a steady output voltage in response changes in a panel voltage of the solar panel. A third stage of the inverter includes a DC to AC converter that provides less than a 50 VAC load voltage to a load. A second stage of the inverter is coupled between the first and third stage and provides an isolated electrical power coupling therebetween. The circuit further includes a controller with a sync interface that communicatively couples the controller to other controllers dedicated to one or more other respective inverters of a solar array via a sync signal. The controller and the other controllers synchronize the third stage of the inverter with third stages of the other inverters via the sync signal. The third stages of the other inverters and the third stage of the inverter are coupled in series to provide a load output voltage.

In another embodiment, a system includes two or more solar panels each outputting a panel voltage less than 50 VDC. Two or more inverters of the system each include: a first stage electrically coupled to a dedicated one of the solar panels and performing a DC-to-DC conversion that provides a steady output voltage in response changes in the panel voltage; a third stage comprising a DC to AC converter that provides less than a 50 VAC load voltage to a load; and a second stage coupled between the first stage and the third stage and providing an isolated electrical power coupling therebetween. The system further includes two or more controllers each coupled to respective ones of the two or more inverters. The two or more controllers each have a sync interface that communicatively couples the two or more controllers to each other via a sync signal. Each controller synchronizes the third stage of it respective inverter with the sync signal. The third stages of the two more inverters are coupled in series to provide a load output voltage.

These and other features and aspects of various embodiments may be understood in view of the following detailed discussion and accompanying drawings.

BRIEF DESCRIPTION OF THE DRAWINGS

The discussion below makes references to the following figures, wherein the same reference number may be used to identify the similar/same component in multiple figures. The figures are not necessarily to scale.

FIGS. 5, 6 and 7 are side views showing snow fence mounting of solar panels according to an example embodiment.

DETAILED DESCRIPTION

The present disclosure is generally related to solar energy installations using photovoltaic panels. There is a marked increase in interest in clean energy generation to reduce greenhouse emissions. Photovoltaic panels are an increasingly popular option due to the decreased material costs and flexibility in where the panels can be installed. One barrier to increased adoption of solar electricity generation is local opposition to installation of the solar arrays. Such opposition may be due to aesthetics, loss of farmable land, etc. One option that is considered in the present disclosure is the use of public infrastructure that is already built or planned, thus unlikely to face the same opposition as large solar installations that cover many acres of land. In particular, this disclosure relates to installation of solar panels on roadside-adjacent structures such as noise barriers or snow fences.

In 2019, the Minnesota Department of Transportation implemented more than 135 miles of noise barriers and 10 miles of structural snow fences. These installations are pure expenditure in a sense and cost more than $200 million. Enhancing them through solar integration can allow local governments to support renewable energy, reduce carbon pollution and achieve operational cost savings. For example, assume that each solar panel is about 330 W and that 1,000 panels could be integrated into 1 mile of noise barrier or snow fence. Considering that the solar irradiance changes throughout a year, these panels could generate up to 330 kW per mile, which is equivalent to 1,300 kWh of energy per mile per day, on average. With such an initiative, systematic research was conducted to develop solar noise-barrier and snow-fence system using commercial and self-designed components. The stability and suitable dimensions of the solar highway structures and their detailed connections are described herein.

Figure 1:
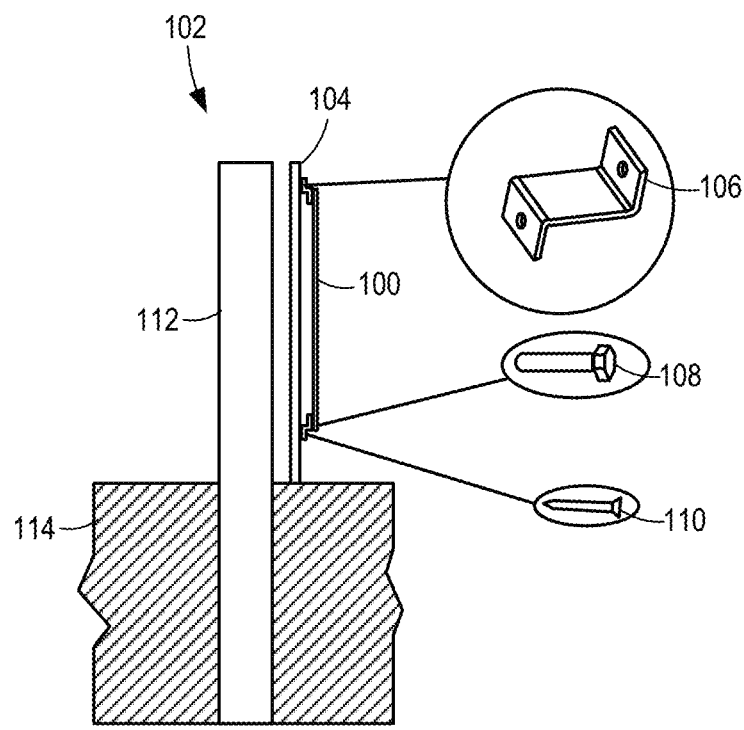
FIGS. 1 and 2 are side views showing physical installation of solar panels according to an example embodiment.

The technologies described herein can enable an integrated energy-harvesting system along roadways, which will produce green energy, will not occupy additional land, and is easy to construct. The system component design. including the mechanical mounts, electrical connectors, controllers, and converters/inverters, is tailored to account for specific conditions expected to affect roadside structures.

brackets 200, using similar mounting hardware as shown in FIG. 1. Additional details of the solar sound barrier's structural design according to the embodiment shown in FIG. 1 are listed below in Table 1. The loads in Table 1 are due to self-weight of the panels and wind-load. The wind pressure assumed for such a system is 30 psf. The self-weight of each panel (4×8 ft) is estimated to 60 lbs.

| Noise-barrier component | Product | Vertical load demand | Capacity (or weight) | Lateral load demand | Capacity |
| --- | --- | --- | --- | --- | --- |
| Solar panel | Panasonic HIT N330 Watt Mono Solar Panel | — | 40.81 lbs | — | 50 PSF (2400 Pa) |
| Bracket | 1/8" thick and 1.5" wide aluminum, z shape brackets | — | 1000 lbs | — | 1000 lbs |
| Connection between bracket and solar panel | 1/4" Grade 2 bolts | 15 lbs | 1766 lbs | 160 lbs | 1060 lbs |
| Connection between bracket and noise-barrier wall panels | #14 screw | 15 lbs | 715 lbs | 160 lbs | 429 lbs |
| Noise-barrier wall panels | 2 × 8 | — | — | 1920 lb-in | 14703 lb-in |
| Post | 12 × 18 reinforced concrete | — | — | 92,000 lb-in | 600,000 lb in |
| Connection between noise wall panels and the noise barrier wall post | Use current configuration | — | — | — | — |
| Connection of the wall post with the foundation | 7-ft embedded length | — | — | 7680 lb-ft | 8733 lb-ft |

The system is designed for improved lifecycle costs, enhanced safety, such as ensuring low-voltage operations via the system's modular configuration. The effect of solar panels on the primary functions of the structures (e.g., reducing snowdrift and or noise) was also considered. Such a system is expected to provide equivalent or better snow control and/or noise reduction compared to the existing snow fences or noise barriers.

Structural Design

In FIG. 1, a side view shows details of a solar panel 100 installed on a noise barrier 102 according to an example embodiment. The solar panel 100 is installed vertically, fastened to a noise-barrier wall panel 104 via z-brackets 106. Bolts 108 can be used to fasten the solar panel 100 to the z-brackets 106, and screws 110 can be used to fasten the z-brackets to the noise-barrier wall panel 104. The noise barrier 102 is secured to the ground via posts 112 embedded within a foundation 114.

Figure 2:
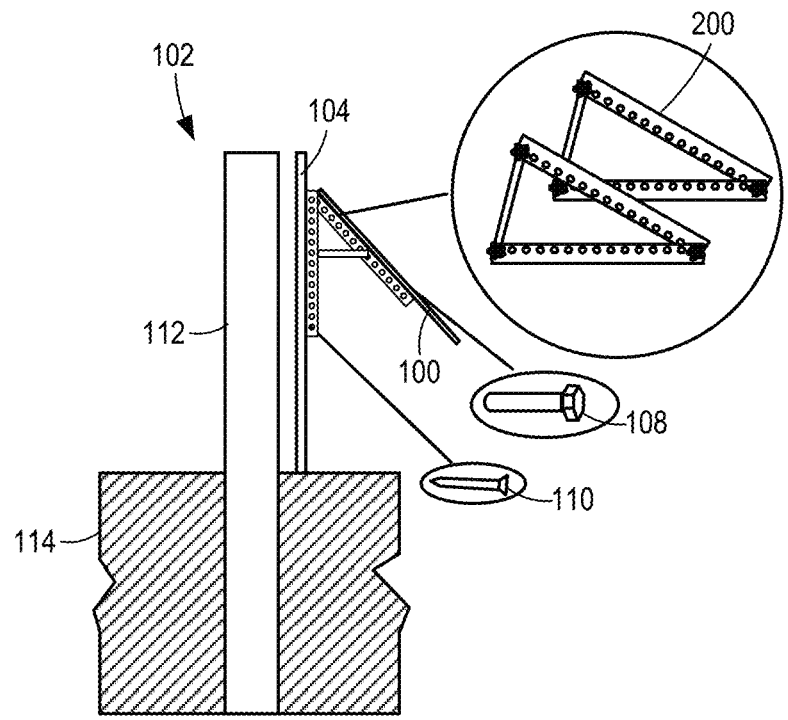

In FIG. 2, an alternate mounting configuration is shown for the solar panels 100. In this example, the solar panel 100 is tilted relative to the panel 104 via adjustable angle brackets 200, using similar mounting hardware as shown in FIG. 1.

Commercial mounts for solar panels are available on the market, and they could be used for solar noise barriers or snow fences. An example commercial pole mount is shown in the side and perspective view of FIGS. 3 and 4. An adjustable mount 302 is shown attached to a pole 300 that may be part of a snow fence and/or noise barrier. This mount 302 is manufactured by Engineered Power Solutions and fits the purposes of solar noise barriers and/or snow fences.

Figure 3:
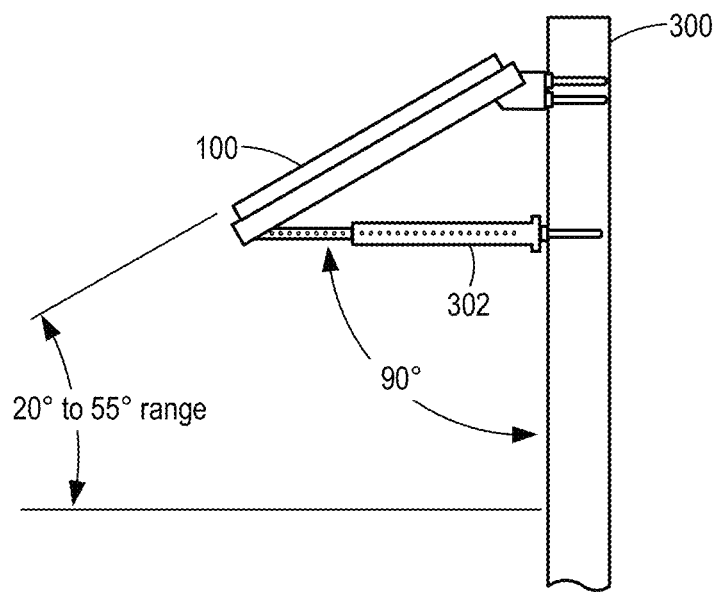
FIGS. 3 and 4 are side and perspective views of a pole mount for solar panels according to an example embodiment.
Figure 4:
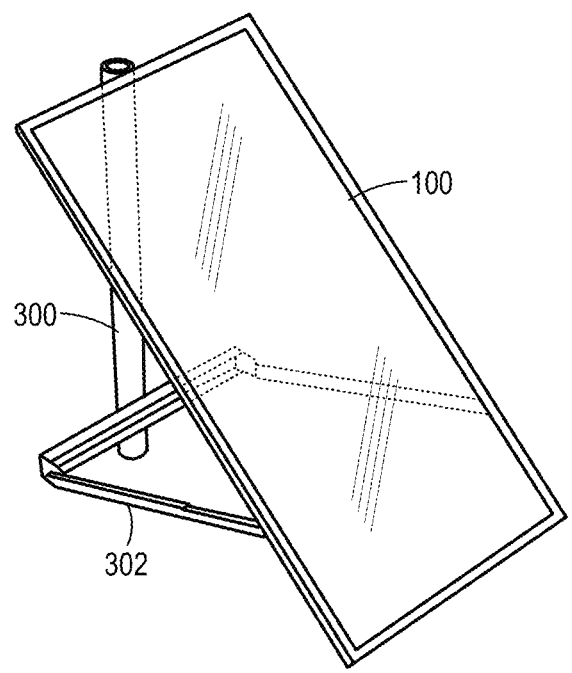

For snow fences, photovoltaic panels may be installed next to each other using pole mounting with a mount/connection 302 as shown in FIGS. 3 and 4. In FIG. 5, a front view shows a snow fence solar array according to an example embodiment. A series of solar panels 100 are mounted to poles 300 via mounts/connections 302 at either end of each solar panel 100. For snow drifting purposes, it is better to install the solar panels 100 on the top-most rows because the snow accumulation may block the radiation for the lower rows. Based on the catalog provided by Engineered Power Solutions, the mounting connection 302 withstands 30 psf (115-mph wind loads) with high-tensile strength and corrosion resistance For construction convenience, a simplified connection is suggested for the solar snow fences in some cases, as shown in the plan views of FIGS. 6 and 7. Considering that vertical loads due to self-weight are 60 lbs and that horizontal loads are 960 lb per panel due to the 30-psf wind load applied to the 4'×8' panels (the worst case scenario), a steel post with side wings is suggested for the solar snow fences as shown in FIGS. 6 and 7. For the extended wings coming from the solar panels, a steel plate of A36 ¼×2 is selected. Its shear capacity 38.88 kips is much larger than the load demand of 0.96 kips. The two wings on the HSS section post could be welded with the same plate size. The bolts are ¼" grade-2 bolts, with a tension capacity of 1.77 kips and a shear capacity of 1.07 kips for each one. The screws to the solar panel are #14 screws. There are two screws at each location. All the capacities are well above the load demands for the required wind load.

The impact of solar panels on noise reduction performance was verified in a small-scale laboratory test and via modeling. Generally, noise barriers with solar panels may not reduce noise as much as barriers without panels (e.g., due to reflections at high frequencies), noise barriers with solar panels are expected to provide reasonable attenuation of noise for most purposes. The impact on vehicle drivers from solar panel glare was also modeled and tested. Although the panels can produce strong reflections under certain conditions, for a majority of the time (99.9%), the solar light will not cause any potential detrimental impact on the drivers. Modeling and testing were also done on solar snow fence arrangements to determine how well the panels will block snow drifts, and these are expected to be effective snow barriers.

Because the solar panels are installed on roadway-adjacent structures, analyses described herein were performed to estimate the effects of vehicles colliding with the structures and/or panels. Drop testing and high-speed gas-gun testing were performed on test photovoltaic panels. These tests show that the panels do not pose any additional safety concerns over impact with a snow fence or noise barrier with/without panel. One issue that is also considered in the system design that might cause a safety hazard due to impact is high working voltages. These issues are addressed in the electrical design section that follows.

Electrical Design

Figure 8:
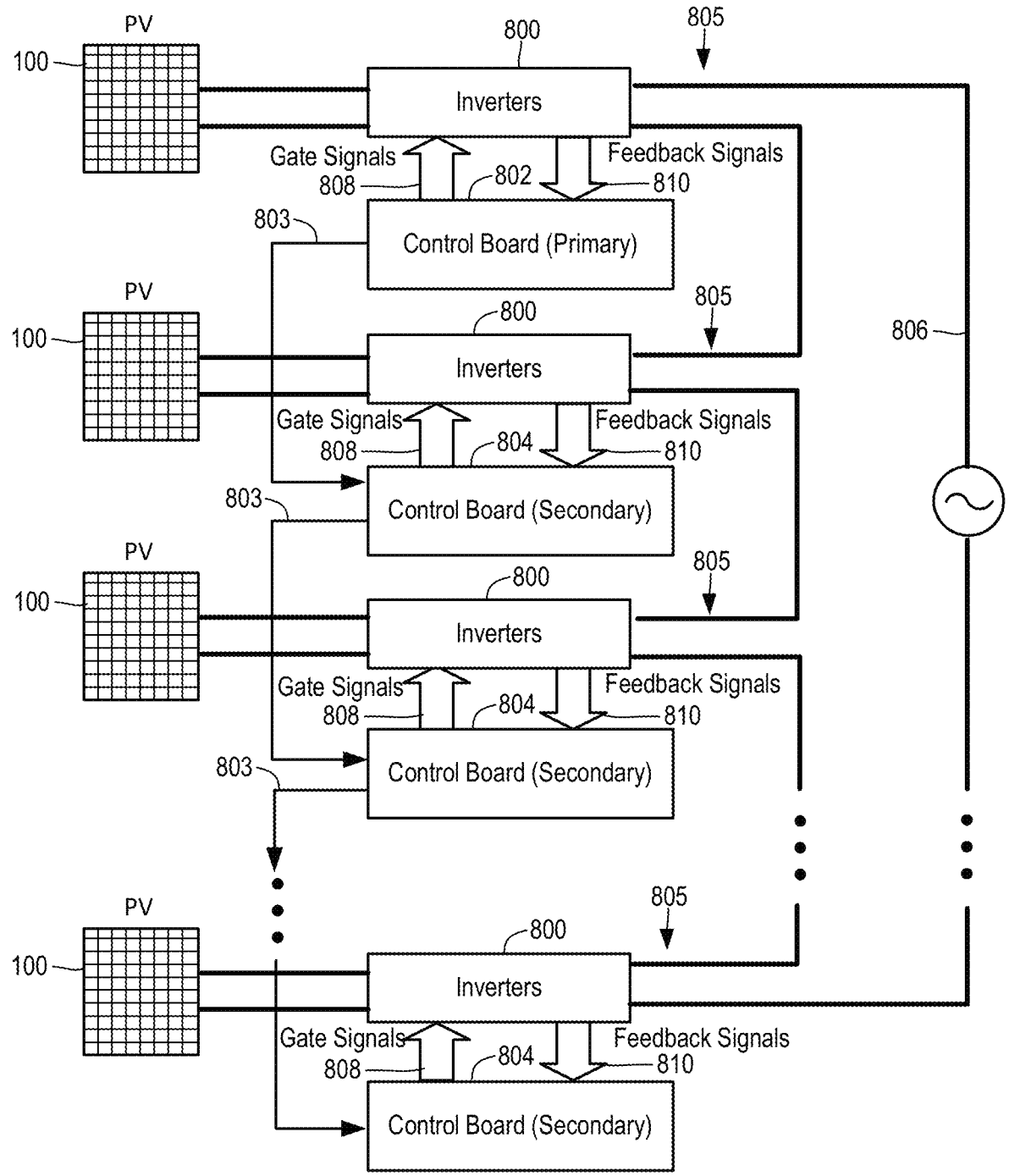
FIG. 8 is a block diagram of electrical components of a solar system according to an example embodiment.

In FIG. 8, a block diagram shows electrical components of a solar array according to an example embodiment. A plurality of solar panels 100 are each connected to a dedicated inverter 800. Note that although one solar panel 100 is shown connected to each inverter 800 in FIG. 8, each inverter 800 may take power from two or more solar panels 100, e.g., a set of panels wired in series and/or parallel. Among other things, the inverters 800 convert direct current (DC) from the solar panels 100 into alternating current (AC). The AC power outputs 805 of the inverters 800 are combined together in series to power an output bus 806, which can be coupled to the electrical mains, e.g., either directly or via a step-up transformer.

Each inverter 800 is coupled to a control board 802 or 804 (also referred to herein as a controller), and the control boards 802, 804 are coupled to each other via a bus 803. All of the control boards 802, 804 may be functionally identical as far as hardware, software, and/or firmware. During operation, one of the control boards (in this example control board 804) assumes a primary role, and the other control boards 802 assume a secondary role. Any of the secondary control boards 802 can assume the primary role in case of a failure of the current primary control board 804.

The solar noise barrier and snow fence system adopts an inverter topology called a solid-state transformer (SST). In one embodiment, a group of 12 power transistors is used to construct a power-mode switch module for the inverters 800. The inverter's voltage and current sensors send information 810 to the control board 802, 804, and the control board's processor produces appropriate output signals 808 to control the power transistors' states. In this way, the control board 802, 804 has the ability to read the sensor outputs from the main module in order to prevent unstable operation.

There are several considerations for the safe implementation of power systems. One consideration is direct accessibility for the technicians. In the event of emergencies, the entire system should be accessible in order to quickly disable it. The modules should be isolated so that a problem with one module does not affect other modules in the chain. Due to the high-frequency isolation transformer design inside each inverter 800, only low-voltage DC (30~50 V) and low-voltage AC (36 VAC) are generated within each inverter 800, preventing potential electrocution even when the solar panel(s) 100 are disconnected and damaged from an accident. This feature gives an input-parallel, output-series connection as seen in FIG. 8.

In the event of vehicle accidents, there are potential hazards with roadside photovoltaic (PV) systems. Through the proposed module inverter 800 and controller 804 system, human can only be in contact with low-voltage DC on the PV side, which prevents or minimizes the risk of high-voltage human exposure. The controller 804 has a built-in function to read the output voltage and the current, which can rapidly turn the output 805 off when such dangerous conditions are present.

Fault conditions can be resolved by using a hardware interruption. When a fault is detected in one module, the chain is broken. An external hardware trigger immediately halts the software's programmed function and sends a signal to the next controller, triggering the next hardware interruption. The modules can be reset by a technician. This procedure prevents the entire system from energizing the output bus 806 again. In practice, the entire process happens in a matter of milliseconds.

Figure 9:
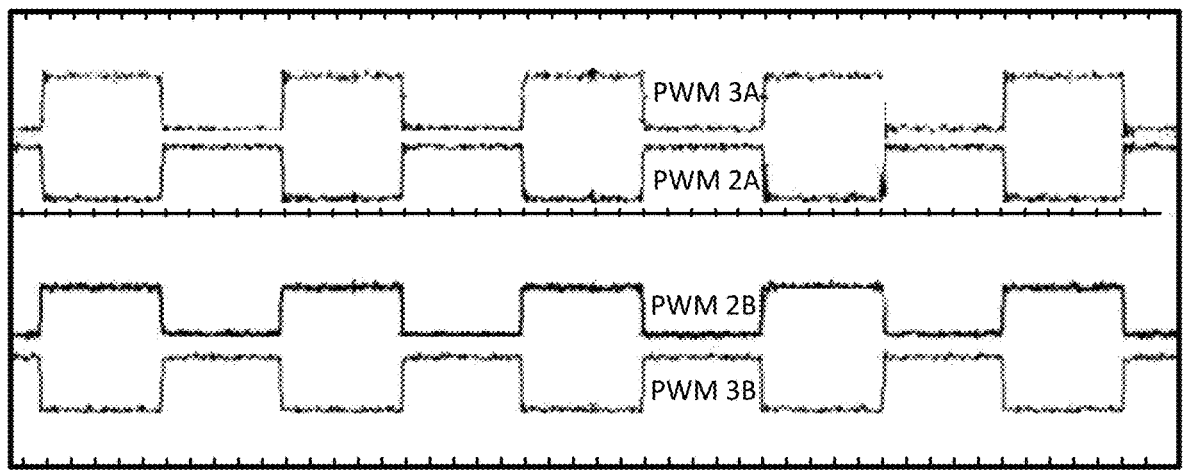
FIGS. 9, 10, and 11 are oscilloscope images showing outputs of a controller according to an example embodiment.
Figure 10:
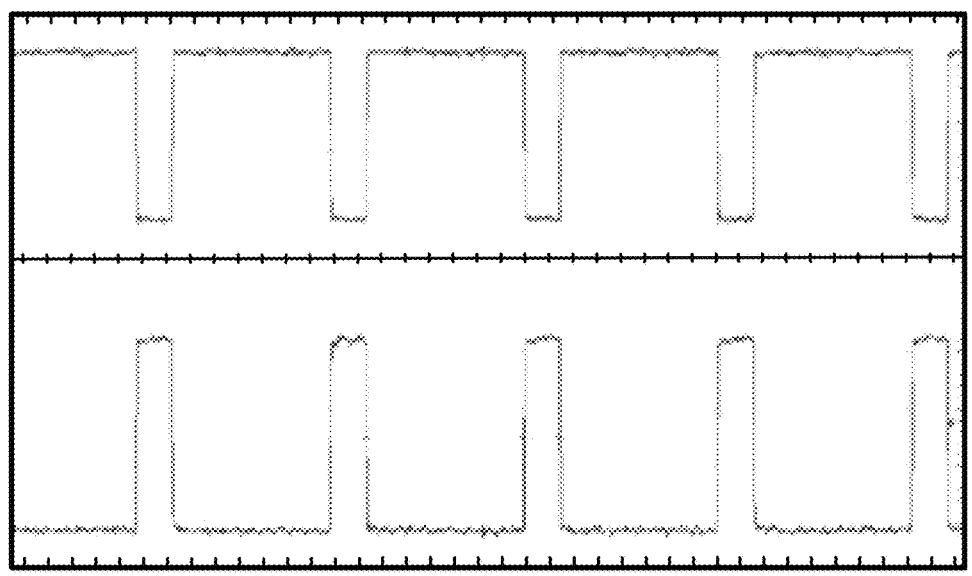
Figure 11:
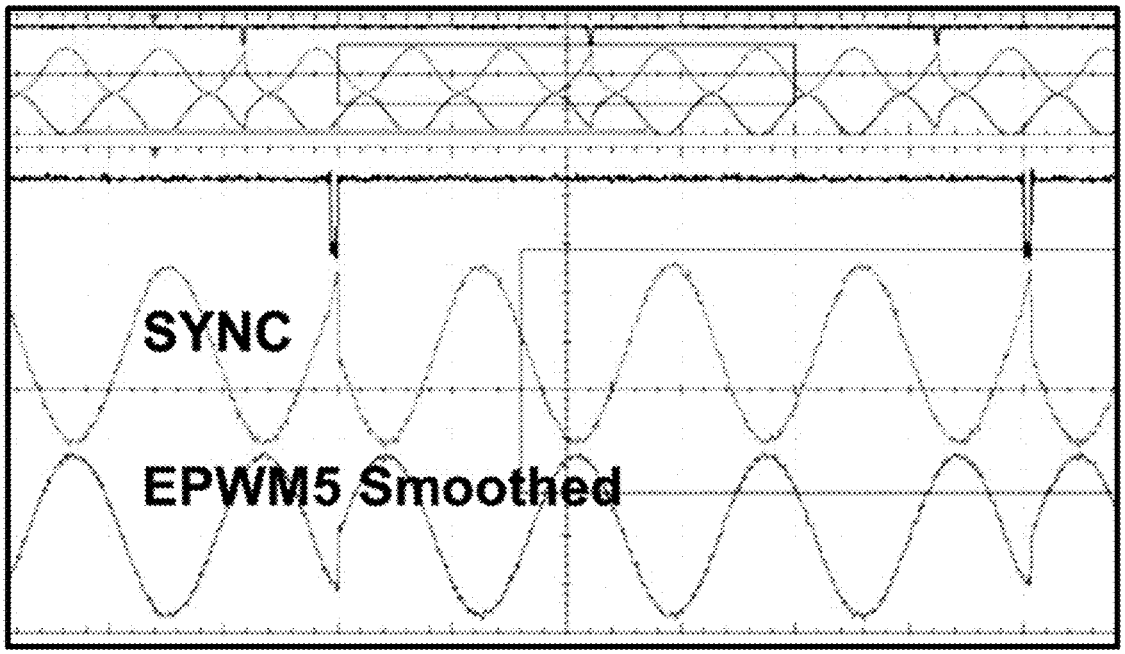

In one embodiment, the control board uses an TMS320F28335 real-time microcontroller. The microcontroller's pulse-width modulation (PWM) outputs were first tested for a phase delay along the traces. With 50-ohm loads on the controller's output, delays around 4 nanoseconds were recorded, which was negligible for this application. The 250-kHz PWM signals were generated in complementary pairs in the software and were probed with an oscilloscope. The graph in FIGS. 9 and 10 are screen captures of a sample of the oscilloscope output. The sample in FIG. 10 includes signals 2A, 2B, 3A, and 3B, and shows the inverse coupling of the A and B signals, which allows for the inverter to function properly. Signal pairs 5A and 5B in FIG. 10 demonstrated the variable PWM. In EPWM5 and EPWM6, the PWM signals were quickly modulated to form a 60-Hz period. This PWM signal was smoothed to simulate the grid output (FIG. 11).

A third signal, sync, is used to reset the sine wave to align the output with the power grid. A sync interface may be provided on each controller, e.g., an external input-output pin, and the secondary controllers monitor the sync signal via the respective sync interfaces. The primary controller's output is a 60-Hz pulse, and secondary controllers reset themselves whenever this signal is received. The sync pulse is forwarded to the next module in the chain. If no signal is given for 3 continuous power cycles (50 milliseconds), the controller assumes that it is the primary and generates its own signal. This simple chain allows for versatility in the event that one controller is disabled. The signals are intentionally given out of time in this example to demonstrate the sync signal's role. In a practical setting, the sync would pulse at 60 Hz, and EPWM5 and EPWM6 would be continuous sine waves.

In other embodiments, the sync signal can be replaced or augmented with an arbitrated bus such as Controller Area Network (CAN) bus, I2C bus, and/or some form of primary/secondary arbitration. In such a system, one CAN node can be embedded in each controller. The nodes are coupled via a CAN bus, over which digital CAN messages are broadcasted. For purposes of this disclosure, the use of CAN messages is considered a form of sync signal. Such CAN messages can be received simultaneously over the bus by all of the nodes and processed substantially simultaneously to synchronize the PWM. Further, the CAN protocol includes provisions that allow one of the nodes to arbitrate and assume a master/primary role if one of the current primary node has not transmitted in a predetermined amount of time. For example, all of the affected secondary CAN nodes can transmit a high-priority "assume primary role" message onto the bus after a random delay. The first node that wins CAN arbitration on the bus then assumes the primary role, replacing the failed controller/inverter. Other types of arbitrated busses, such as I2C, could be used instead of CAN.

In other embodiments, sensor feedback from the power grid can be used to detect failure of the primary controller. For example, even if a sync signal is detected, if the primary controller has a failure in its synchronizing operation, this may be detected as a phase mismatch between the power grid and the inverter outputs. Thus, even if a sync signal is still detected, another controller may take over as primary through an arbitration as described above.

The Analog to Digital Converter (ADC) module was debugged, which measures power values in various parts of the power conversion circuit. Values from the 16 ADCs are constantly fed into a mathematical transform which calculates the corresponding analog value. These analog values are stored in a global array. In this way, the controller will know different currents and voltages to disable when the photovoltaic source is disconnected.

Figure 13:
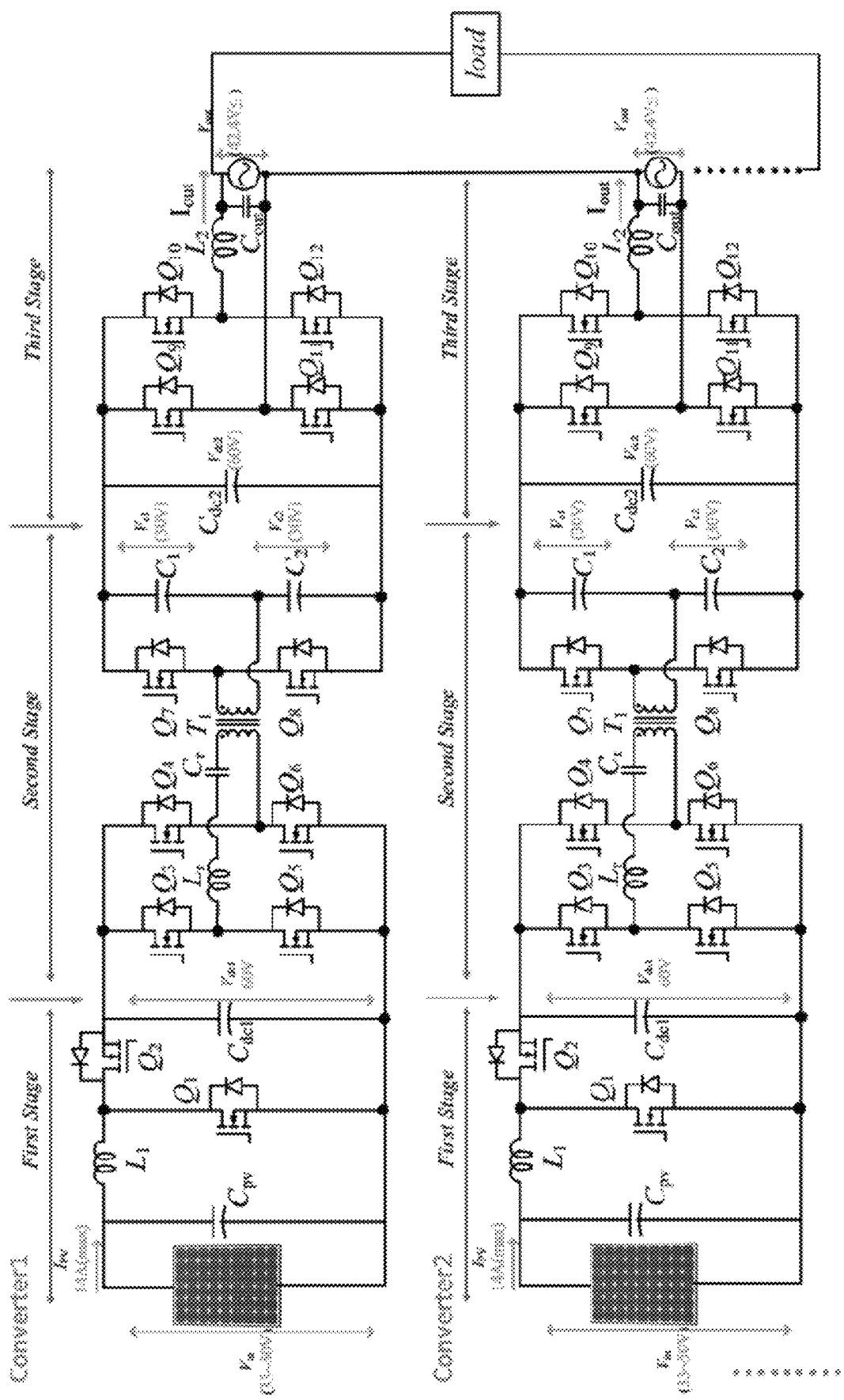
FIG. 13 is a schematic diagram of a pair of power conversion circuits according to an example embodiment.

The inverter topology includes three parts and is shown in the schematic diagram of FIG. 13. The first part is the DC/DC circuit which converts solar energy into electrical energy via PWM inputs to gates of $Q_1$ and $Q_2$. Because the PV panel's output-voltage varies, it is necessary to adopt a DC/DC circuit to keep the PV panel's voltage constant, which could potentially achieve the Maximum Power Point Track of the inverter in future work. The second part is an isolated circuit named the LLC circuit. Through a solid-state transformer, T1, the LLC circuit can isolate the PV panel's side voltage and the load side's voltage for safety purposes. Moreover, the secondary side voltage is allowed to float because four converters are connected in series. The third part is a full-bridge inverter which converts DC voltage to AC voltage for the load. The output AC voltage's root mean square for each inverter is around 28 V. A regular transformer may instead be used for T1, at the cost of additional space on the inverter board.

Gallium nitride (GaN) metal-oxide field effect transistors (MOSFETs) are utilized for the inverter circuit because of their small volume and high switch speed characteristic. Moreover, due to the small power loss with a GaN MOSFET, the heat sink can be saved for a higher power-density printed circuit board (PCB) board.

In normal circumstances, every inverter works at 28 V. When 4 inverters are in a series, the output voltage is around 110 V. If one PV panel is broken or removed from the system, the rest of inverters can still work normally. At that time, each inverter will work at 36 V. The PV panel's voltage as well as the inverter's output voltage and current are detected by the controller. If one of the PV panels is removed, the controller will immediately send an interrupt signal to other inverters in order to remind them to adjust their output voltage. With this method, the entire system's output voltage will stay at 110 VAC all the time.

Figure 12:
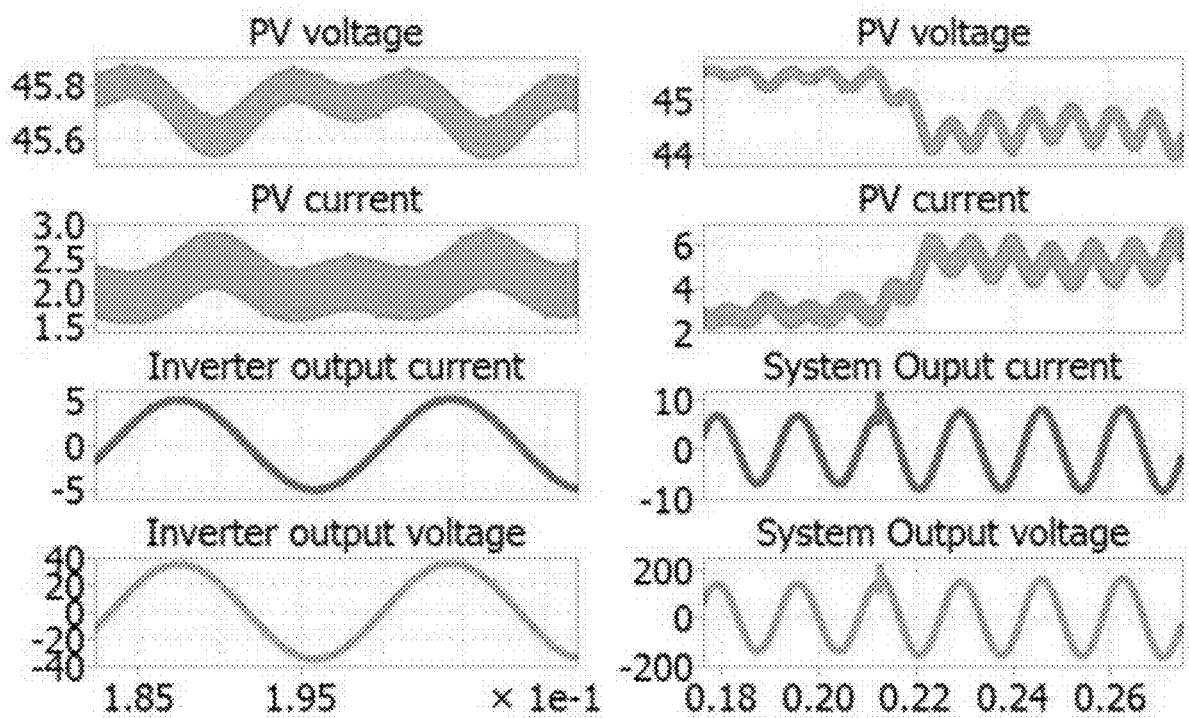
FIG. 12 is a set of oscilloscope images showing power outputs of a system according to an example embodiment.

A series of simulations were conducted to validate the circuit design. The graph in FIG. 12 shows the simulation results for one inverter (the left side) and the entire system (the right side). The PV panel's output-voltage ripples are around 0.4 V, and its output-current ripples are around 2 A. Each inverter's output voltage is around 28 VAC.

The simulation results for four inverters in series are shown on the right of FIG. 12. The system's output voltage is 110 VAC. When one PV panel is removed, each inverter's output voltage will change from nominally 28 VAC to nominally 36 VAC, keeping the system's output voltage at a nominal 110 VAC. Output-voltage overshoot will happen at this time, which can be avoided by optimizing the DSP's control strategy. Note that other combinations of inverters are possible in view of these teachings. For example, eight inverters could be coupled in series to provide a 220 VAC load voltage, yet still retain the safety features inherent in keeping the solar panel output voltage less than 50 VDC and the inverter output voltage less than 50 VAC.

Figure 14:
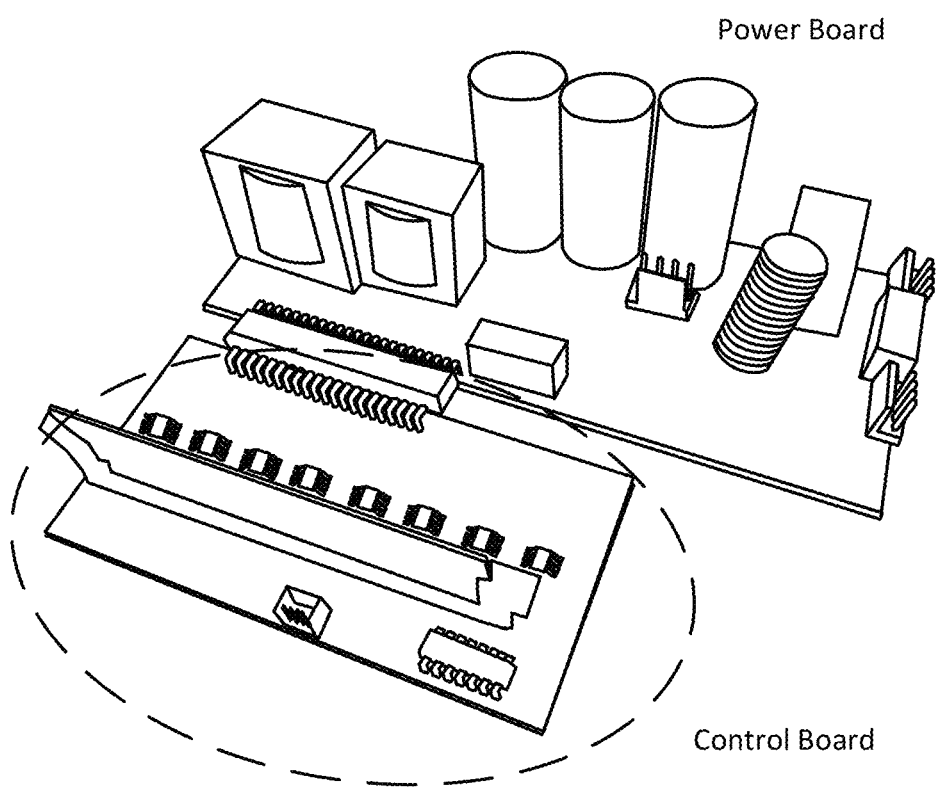
FIG. 14 is a photograph of a prototype controller and power conversion circuit according to an example embodiment.

Every inverter connects with a control board as shown in FIG. 14, which is a photograph of inverter and control board prototypes. Note that in FIG. 14 the controller card is shown as a separate circuit board that is electrically coupled to the inverter board. In some embodiments, the controller and inverter may be integrated on a single board. Even where the controller and inverter are separate circuit boards, the assembly may be referred to collectively as a power conversion circuit, and in other embodiments, they may be considered as separate. For example, in the embodiments shown above, each controller is dedicated to one inverter, and each inverter is dedicated to one or more solar panels. In some embodiments, one controller may control two inverters. Or in other embodiments, a first controller may be dedicated to a first inverter, but may be coupled as a backup to control a second inverter. Similarly, a second controller is dedicated to the second inverter, but may serve as a backup to the first inverter. In the event of a failure of the first or second controller, the second or first controller can assume control of both first and second inverters.

The control board is responsible for signal processing. Like the ADC, the PWM drives and sends synchronization signals. The power board is responsible for energy conversion and transfer. The board aims to convert DC voltage to AC voltage. The power board has 3 stages. The first stage is a DC/DC circuit that converts solar-produced energy to electrical energy at a constant voltage. The second stage is an isolated topology called the LLC circuit. The LLC circuit can separate the PV panel side and the output side for safety purposes. The third stage is a full-bridge circuit which can convert DC voltage to AC voltage for a load.

In order to demonstrate operation of the inverter, experiment demonstrated the steady-state performance and a soft-start test. The DC power supply is used to produce a steady voltage input. The soft-start experiment verifies whether the single inverter can start gradually without damage caused by a current or a voltage overshoot.

The single-inverter, steady-state experiment is completed in three steps. The first step is to verify every stage separately, and in this way, it is easier to check the defects and correct them. The second step is to debug the first and second stages together, and then debug the second and third stages together. The third step is to debug the single inverter as a completed device.

Figure 15:
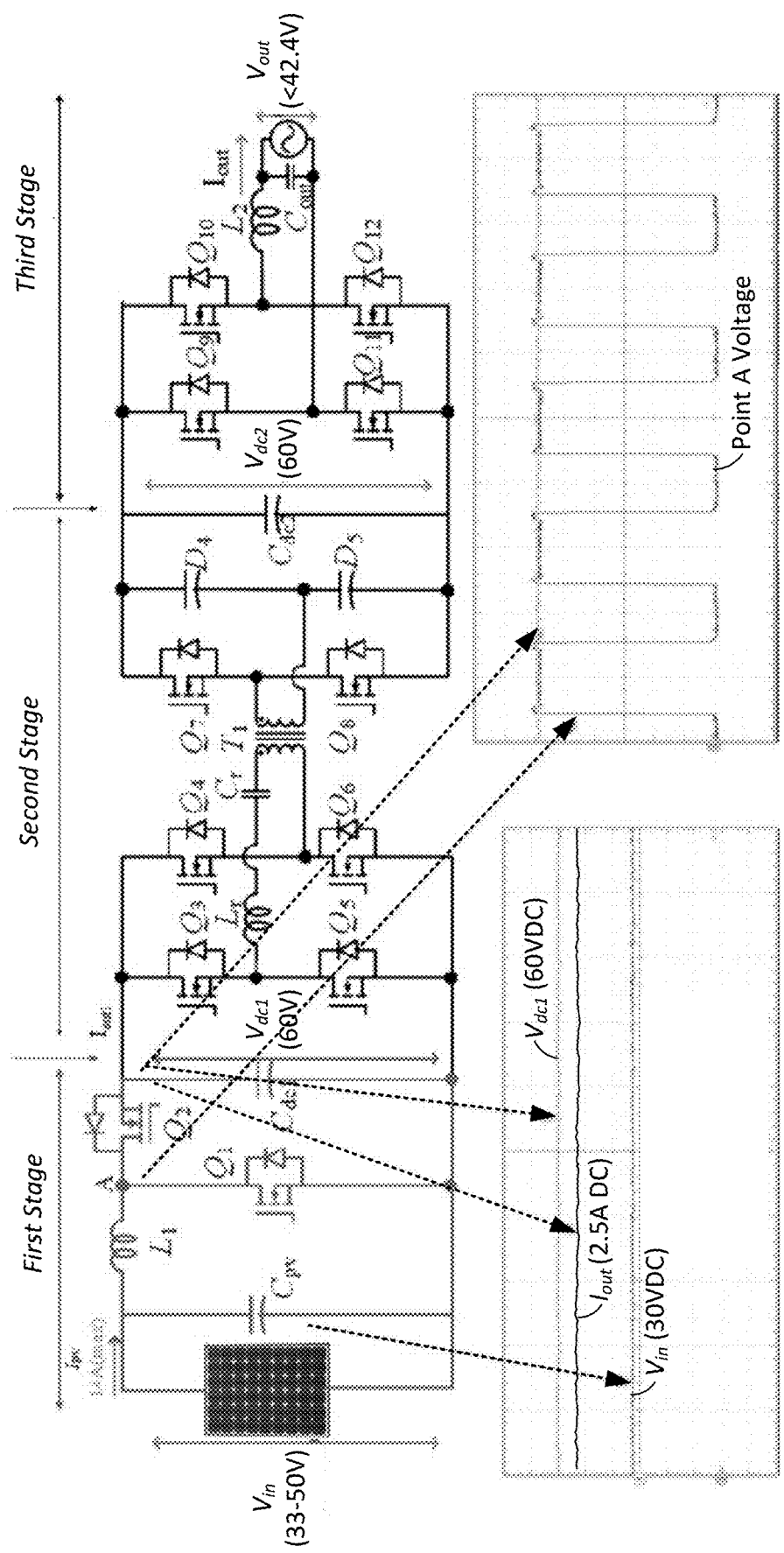
FIGS. 15, 16, and 17 are diagrams showing testing results of a respective first, second, and third stage of a power conversion circuit according to an example embodiment.

The first stage's experimental waveform is shown in FIG. 15. The $V_{in}$, waveform's value is 30 V, which is produced by the DC power source simulating a solar cell. The output current is labeled as $I_{out1}$, and its root-mean-square (RMS) value is around 2.5 A. The $V_{dc1}$, waveform's value is around 60 V. The output power is around 150 watts.

Figure 16:
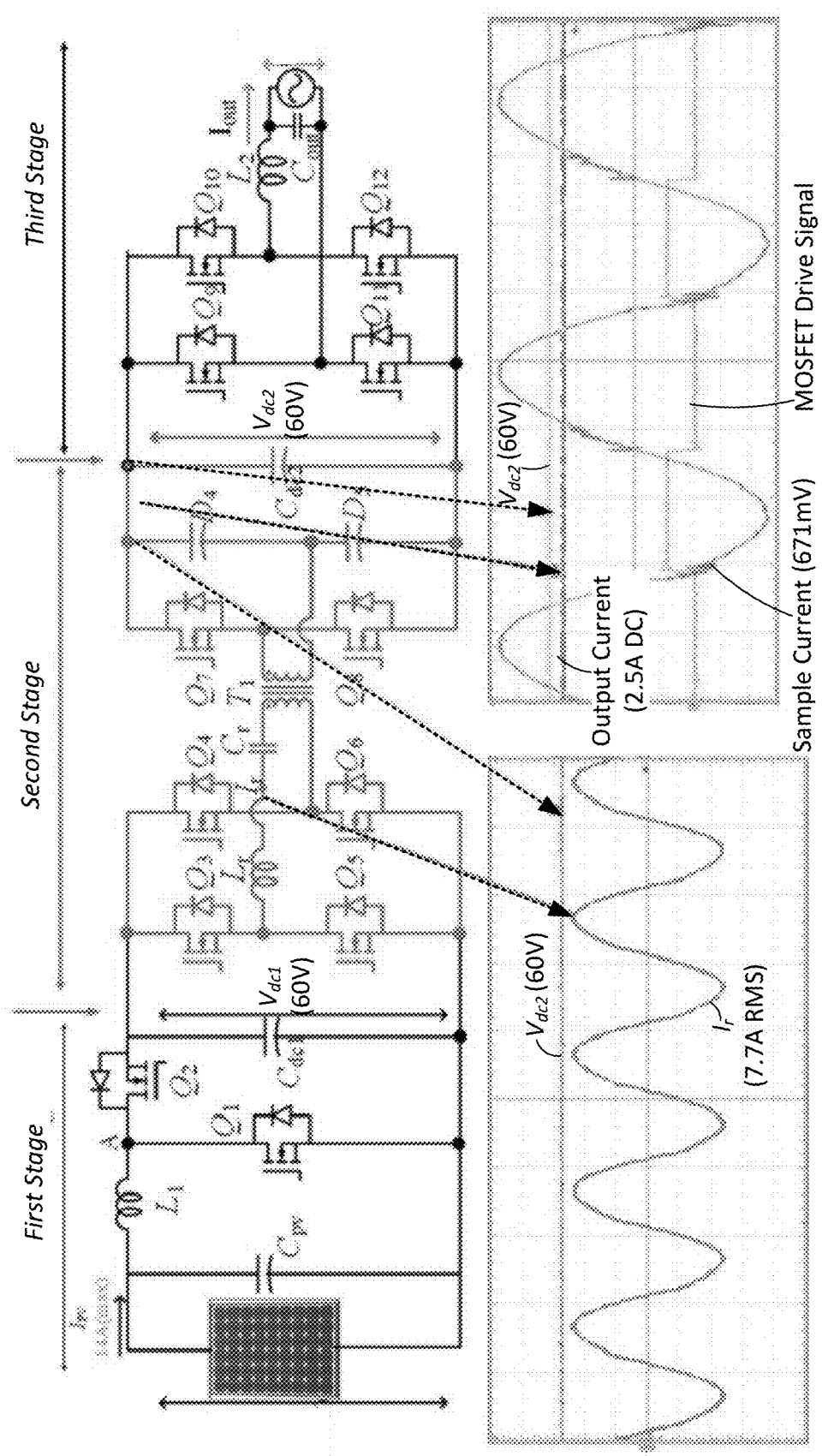

The second stage's experimental waveform is shown in FIG. 16. The value of $V_{dc1}$ is 60 V and is produced by the DC power source. The $V_{dc2}$ waveform on the right has a value of around 60 V. The Output Current waveform in the right figure is the second stage's output current, and its RMS value is around 2.5 A. The output power is around 150 watts.

Figure 17:
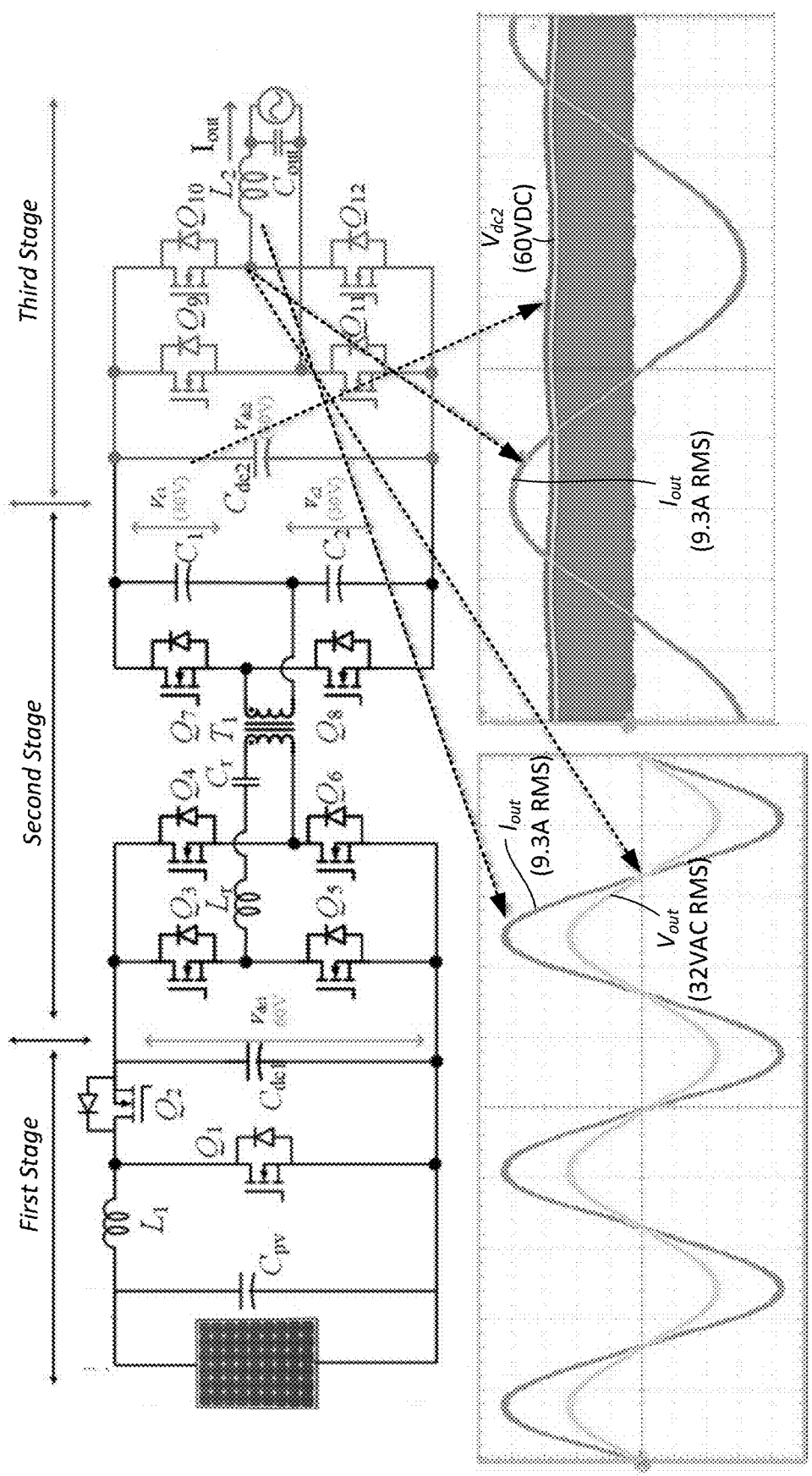

The third stage's experimental waveform is shown in FIG. 17. The $V_{dc2}$ waveform on the right has a value of 60 V that is produced by the DC power source. The $I_{out}$ waveform in the left figure has an RMS value is around 9.3 A. The $V_{out}$ waveform in the left figure has an RMS value of around 32 V. The output power is around 300 watts.

Figure 18:
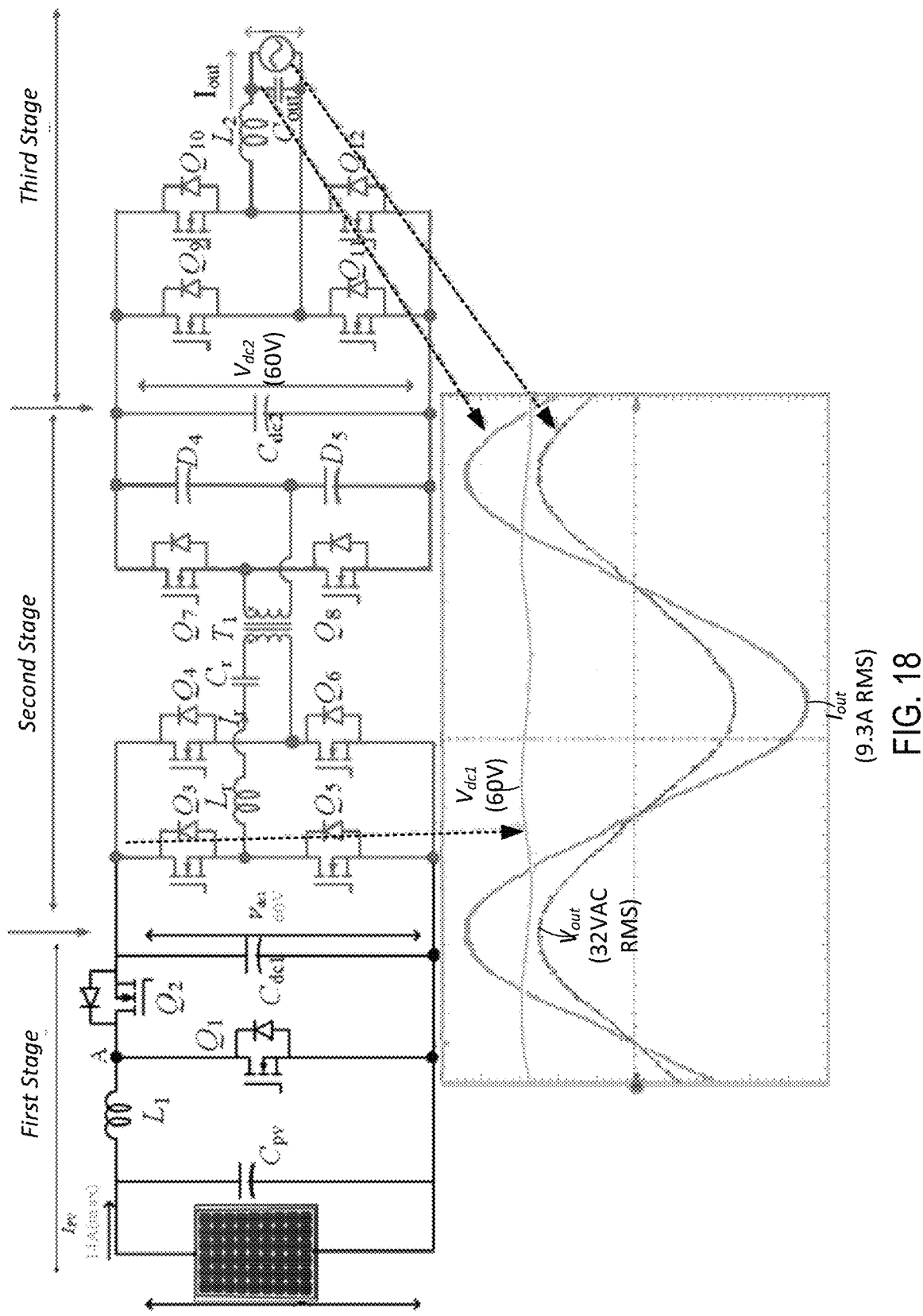
FIGS. 18 and 19 are diagrams showing testing results of multiple stages of a power conversion circuit working together according to an example embodiment.

The second-stage and third-stage joint-experiment waveforms are shown in FIG. 18. The $V_{dc1}$ waveform's value is 60 V that is produced by a DC power source. The $I_{out}$ waveform's RMS value is around 9.3 A. The $V_{out}$ waveform's RMS value is around 32 V. The output power is around 300 watts.

Figure 19:
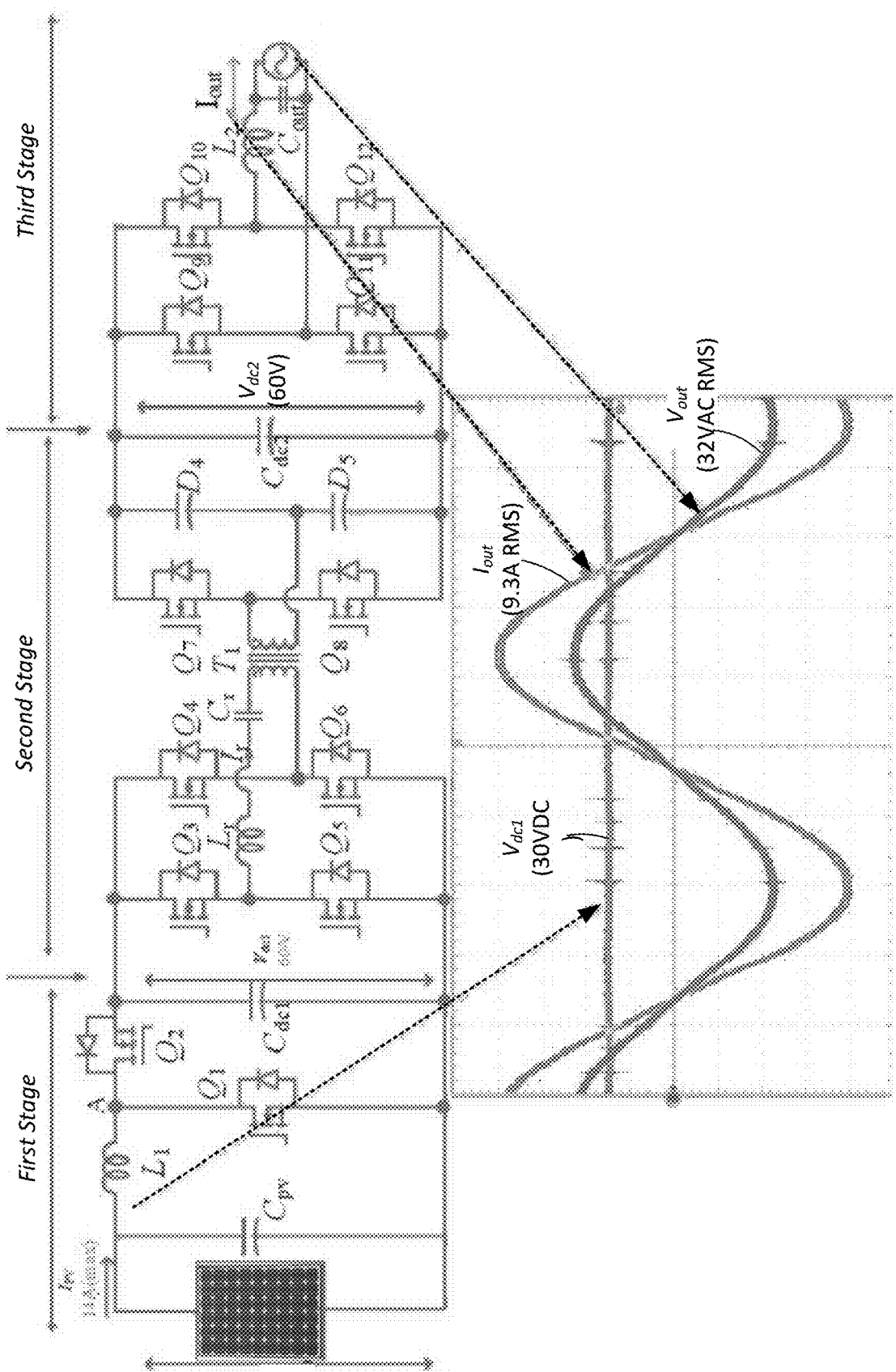

The entire inverter experiment's waveform is shown in FIG. 19. The $V_{in}$, waveform's value is 30 V that is produced by a DC power source. The $I_{out}$, waveform's RMS value is around 9.3 A. The $V_{out}$, waveform's RMS value is around 32 V. The entire inverter's output power is around 300 watts.

The highest temperature rise on the power board is usually from the transformer and power MOSFET, and is an important index for the inverter's working stability. If the MOSFET temperature is too high, the inverter's life will decrease dramatically. Gallium nitride MOSFETs $Q_9$-$Q_{12}$ show the highest working temperature, around 70° C., which is an acceptable value.

A soft start is important because it can avoid the current or a voltage overshoot that may damage devices. For example, when an inverter connects to the DC power source by closing the air breaker, the resonance between the DC power source's capacitor and the wire inductor will cause a very high voltage spike. In this situation, the inverter should stay closed until the spike disappears; otherwise, it is possible to damage the inverter.

Figure 20:
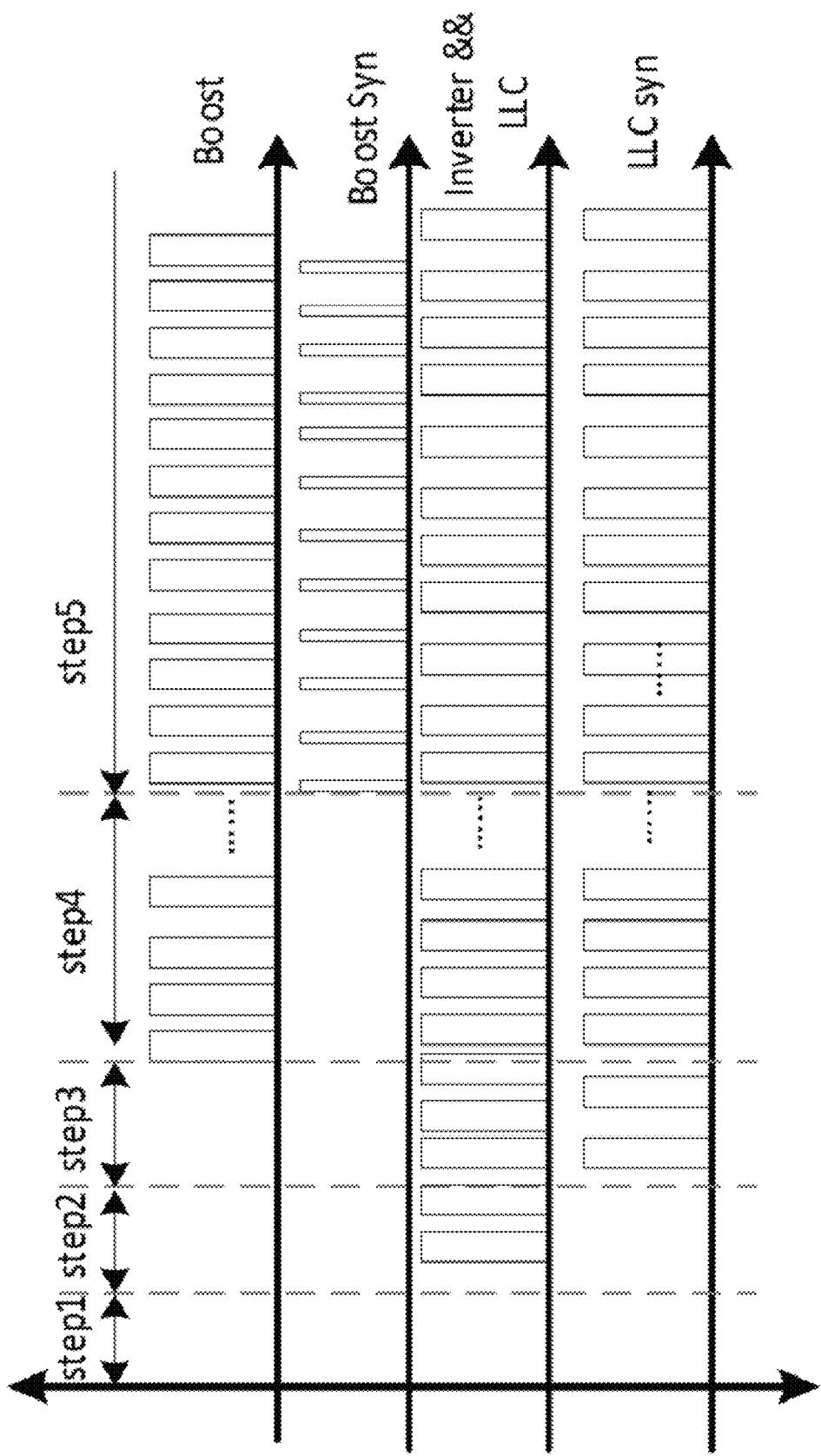
FIGS. 20, 21, and 22 are oscilloscope images showing a soft start test of a power conversion circuit according to an example embodiment.

In FIG. 20, a graph shows the soft-start procedure when the inverter starts to work. Step 1 is to wait until the input voltage, $V_{in}$, is steady. Steps 2 and 3 aim to gradually increase the second stage's voltage, $V_{dc2}$, until it equals the input voltage, $V_{in}$. Otherwise, the current overshoot could damage $Q_3$-$Q_6$. Step 4 is to increase $V_{dc2}$ from $V_{in}$ to 60 V, and step 5 is to keep the output voltage, $V_{out}$, stable.

Figure 21:
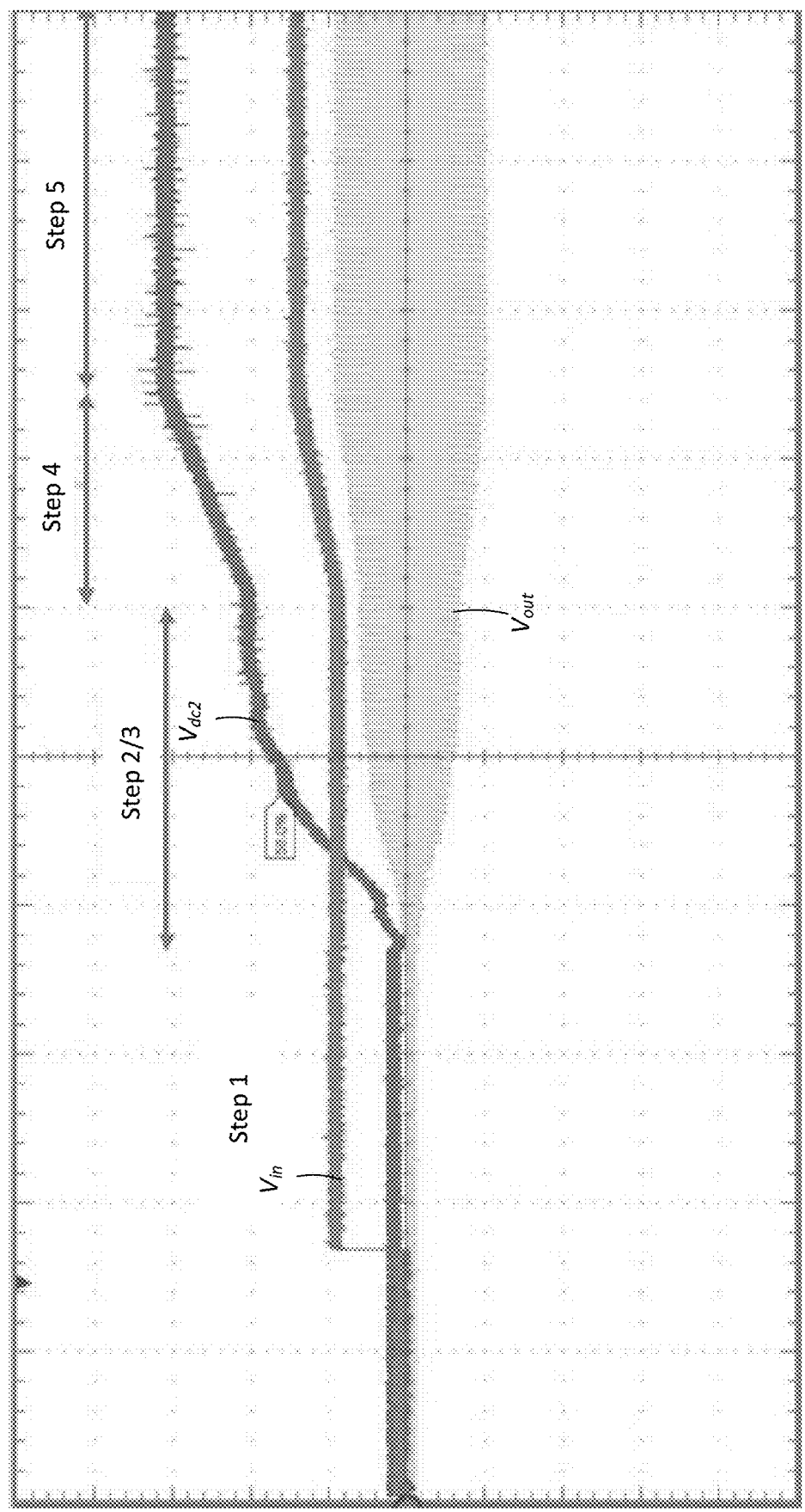
Figure 22:
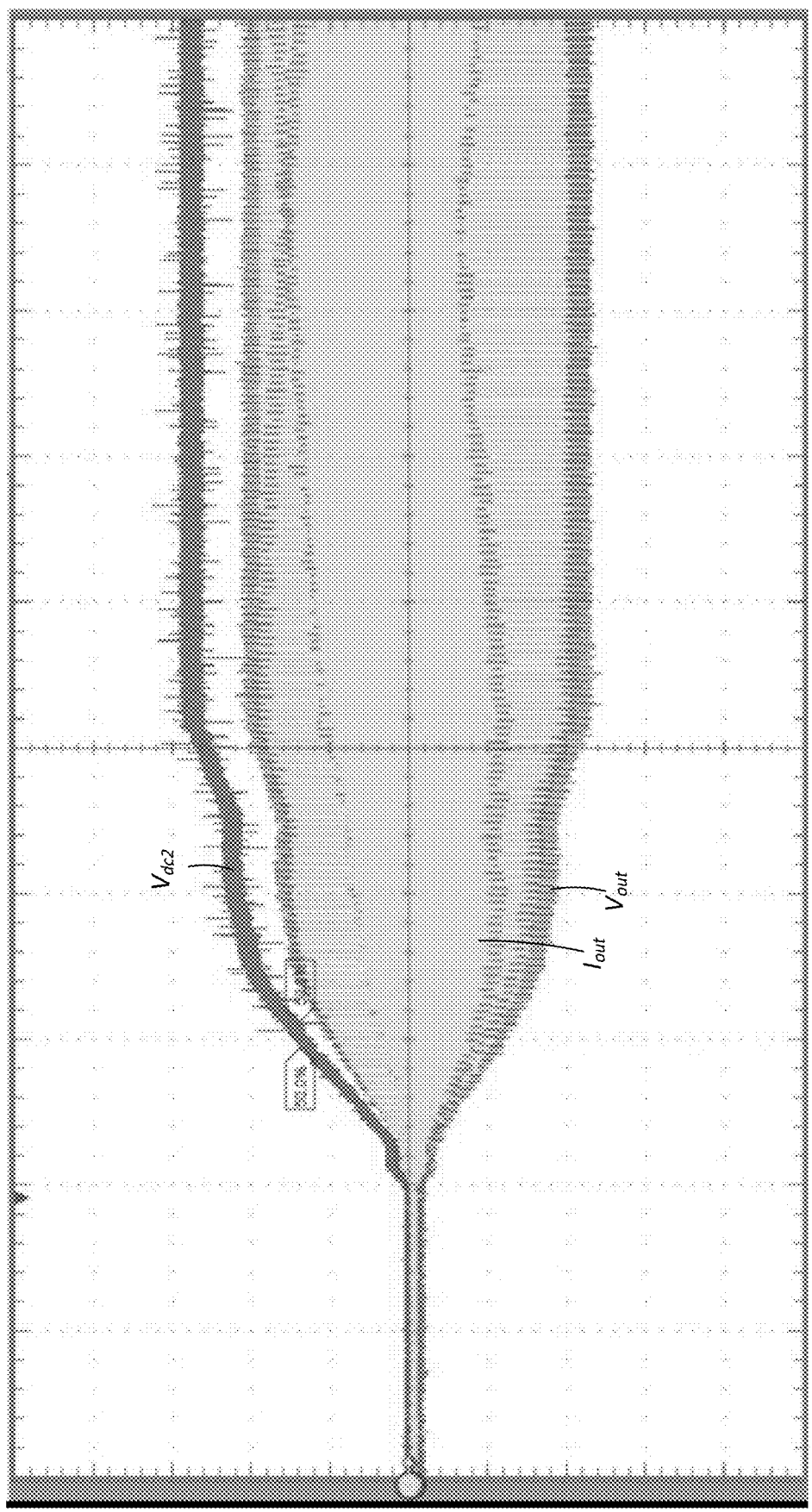

The graph in FIG. 21 shows the single-inverter, soft-start experiment's waveforms, showing input voltage, $V_{in}$, the second stage's waveform, $V_{dc2}$, and output voltage, $V_{out}$ during the steps noted above. There is no voltage spike observed in FIG. 21, which proves the soft-start procedure's feasibility. The graph in FIG. 22 shows the soft-start procedure with 250 watts. The input voltage, $V_{in}$, is 45 V, the output voltage, $V_{out}$, is around 36 V RMS, the second stage waveform, $V_{dc2}$ is around 60 V, and the output current, $I_{out}$, is around 6.9 A RMS.

Figure 23:
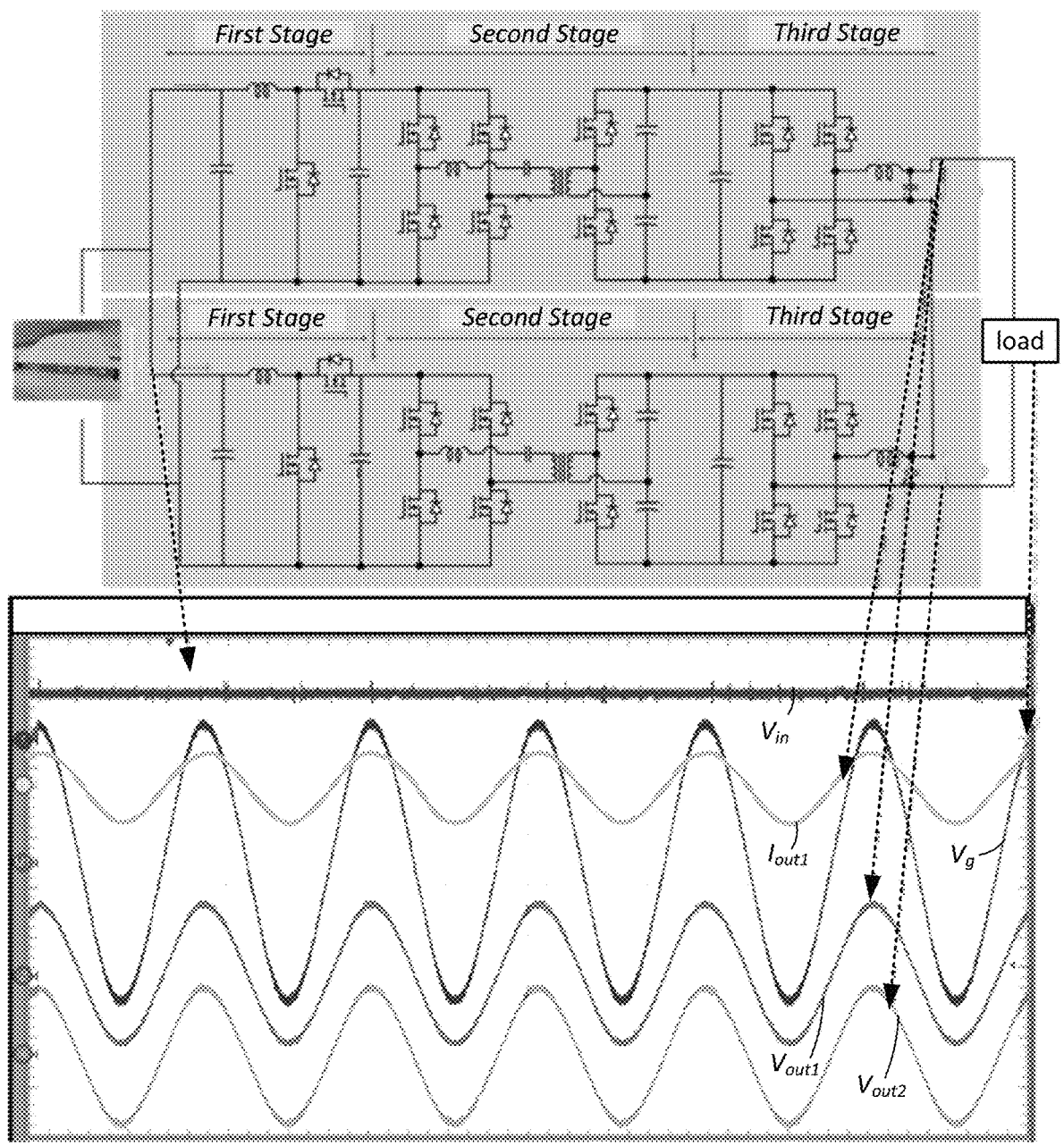
FIGS. 23 and 24 are diagrams showing testing results when combining multiple power conversion circuits according to an example embodiment.

For a solar noise barrier or snow-fence system, connections will be made between multiple inverters. A two-inverter-in-series experiment was conducted, and its results are shown in FIG. 23. The top of FIG. 23 shows the two-inverter-in-series topology and its experimental result is shown at the bottom. A DC power source is used to replace the solar panels in order to supply the two inverters, and the load is assumed to be resistors. The output voltages $V_{out1}$ and $V_{out2}$ of converter 1 and 2 respectively are shown separately and are both around 28.5 V/rms. The output current $I_{out}$, is around 2.5 A RMS, the input voltage $V_{in}$ is about 30 V, and the total output voltage, $V_g$, is around 57.12 V RMS.

Figure 24:
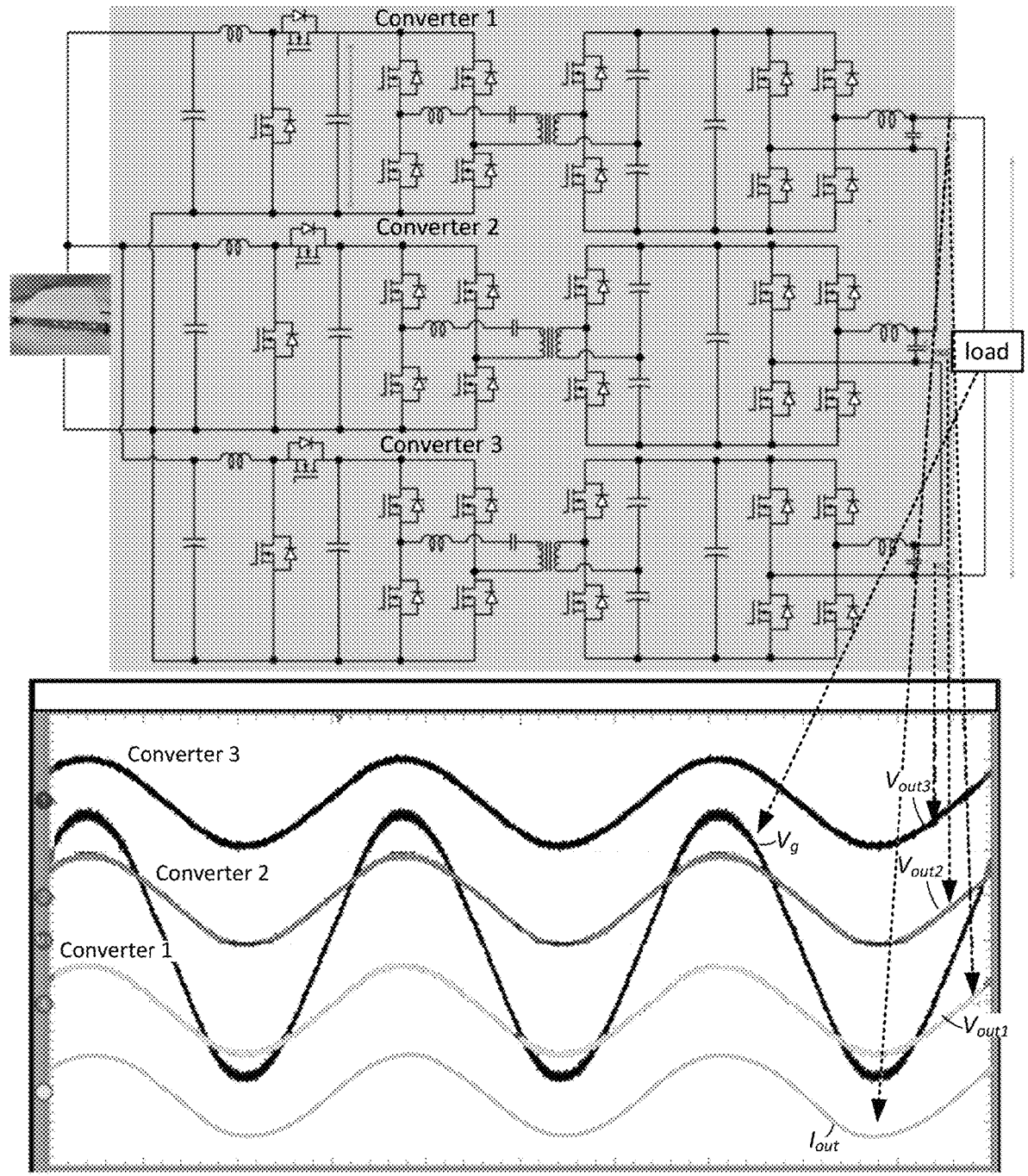

At the top of FIG. 24, a diagram shows a three-inverter-in-series prototype's experimental platform. A DC power source is used to replace the solar panel in order to supply the three inverters, and the load is provided through a resistor. Three inverter-output ports are connected in a series to increase the total output's voltage. The experiment's result when using solar panels for the inputs is shown in the lower part of FIG. 24. The total voltage output, Vg, is around 60 V RMS.

Figure 25:
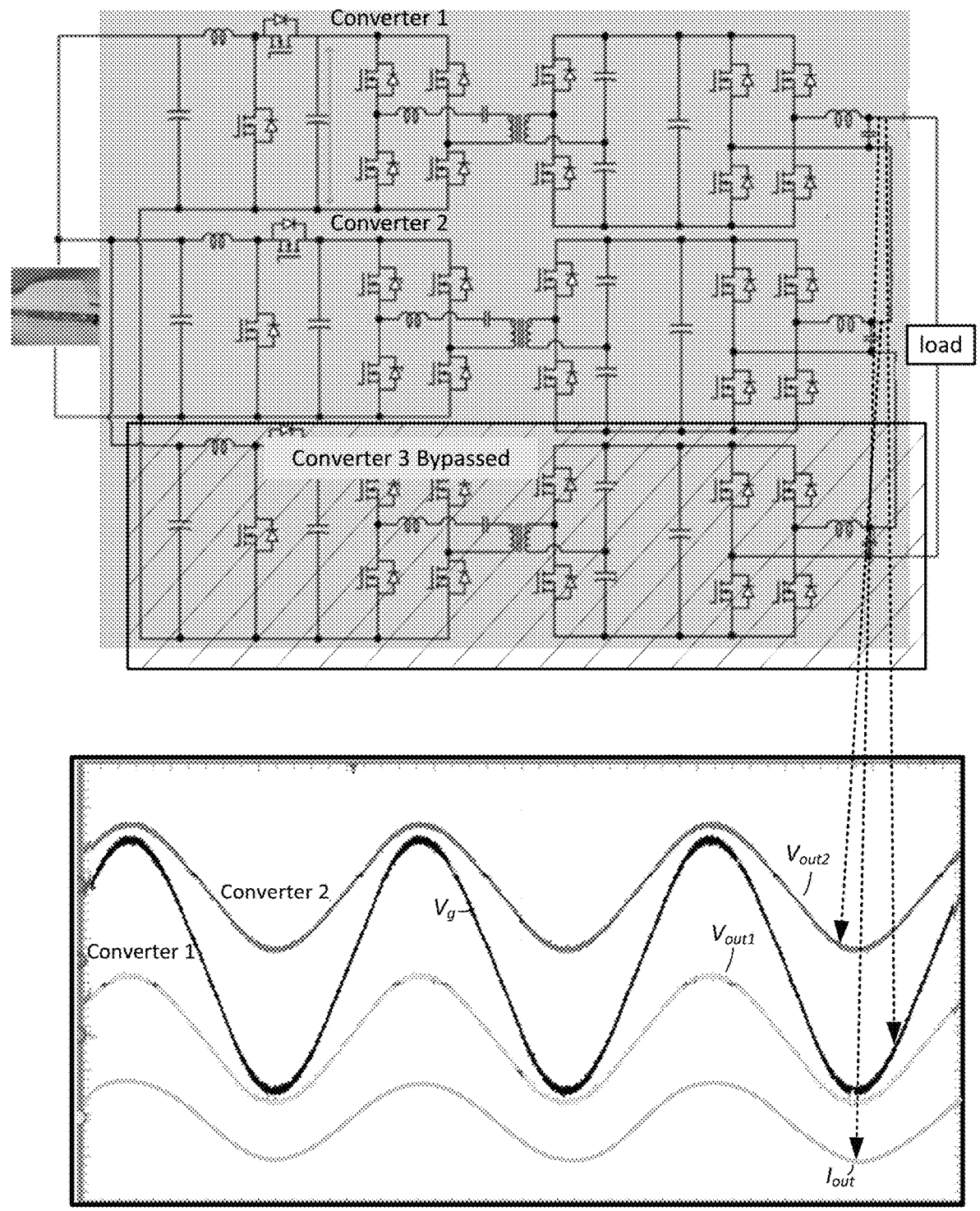
FIG. 25 is a diagram showing results when a power conversion circuit is bypassed in a chain of three power conversion circuits according to an example embodiment.

In FIG. 25 shows the experiment's results when inverter #3 is bypassed or disabled with a three-inverter in-series situation. Converter 3 has a sensor that measures the solar panel voltage and send its controller signals to the other converters 1 and 2 to increase the load voltage to compensate of the panel is disconnected or otherwise fails. The other way around also works if Converter 1 fails. The $V_{out1}$ and $V_{out2}$ of converters 1 and 2 and are shown separately. The total voltage output, Vg, is still around 60 V RMS.

When converter 3 is bypassed, GaN FET $Q_1$-$Q_{10}$ (see FIG. 13) are turned off while GaN FET $Q_{11}$ and $Q_{12}$ are still on. The output's current will flow through inverter #3 by $Q_{11}$ and $Q_{12}$ as well as inductor $L_2$. With this method, the output's current can continuously flow through the load because the closed output-current loop is always established. The experiment's result proves that, when one inverter is bypassed/disabled, the rest of the inverters can still produce the same AC voltage. This technology apparently improves the robustness of the entire system; moreover, which can decrease the maintenance cost for the entire photovoltaic power system Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the diagrams and algorithms illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality.

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

The invention claimed is:

1. A power conversion circuit comprising:
    an inverter, comprising:
        a first stage electrically coupled to one or more solar panels and performing a DC-to-DC conversion that provides a steady output voltage in response changes in a panel voltage of the solar panel;
        a third stage comprising a DC to AC converter that provides less than a 50 VAC load voltage to a load; and
        a second stage coupled between the first stage and the third stage and providing an isolated electrical power coupling therebetween; and
    a microcontroller dedicated to the inverter, the microcontroller comprising a sync interface on an external input-outputs of the microcontroller that directly and communicatively couples the microcontroller to other microcontrollers via a bus, the other microcontrollers each dedicated to one or more other respective inverters of a solar array, the microcontroller and the other microcontrollers synchronizing the third stage of the inverter with third stages of the other inverters via a sync signal sent over the bus, wherein the third stages of the other inverters and the third stage of the inverter are coupled in series to provide a load output voltage, wherein the microcontroller reads information from a sensor that determines a loss of the panel voltage and signal to the other microcontrollers via the bus to increase their load voltages to compensate.

2. The power conversion circuit of claim 1, wherein the microcontroller is operable as a primary controller that generates the sync signal, the other microcontrollers receiving the sync signal via respective external input-outputs of the two or more microcontrollers and using it to synchronize the third stage of the other inverters, wherein the other microcontrollers monitor the sync signal, and if no sync signal is detected for a predetermined amount of time, one of the other microcontrollers operates as the primary controller.

3. The power conversion circuit of claim 1, wherein the third stage comprises an inductor and two activated power MOSFETS in series with the load that allow current to flow through the third stage in response to the loss of the panel voltage.

4. The power conversion circuit of claim 1, wherein the second stage comprises a high-frequency isolation transformer.

5. The power conversion circuit of claim 4, wherein the high-frequency isolation transformer comprises a solid-state transformer.

6. The power conversion circuit of claim 1, wherein the panel voltage of the solar panels and load voltage of the inverter minimize high-voltage human exposure resulting from contact with the one or more solar panels or the inverter.

7. The power conversion circuit of claim 6, wherein the solar array and the inverter are mounted to one of a snow fence or a sound barrier.

8. A system comprising:
two or more solar panels each outputting a panel voltage less than 50 VDC;
two or more inverters each comprising:
- a first stage electrically coupled to a dedicated one of the solar panels and performing a DC-to-DC conversion that provides a steady output voltage in response changes in the panel voltage;
- a third stage comprising a DC to AC converter that provides less than a 50 VAC load voltage to a load; and
- a second stage coupled between the first stage and the third stage and providing an isolated electrical power coupling therebetween;

two or more microcontrollers each coupled to respective ones of the two or more inverters; and
a bus that directly couples the two or more microcontrollers via respective external input-outputs of the two or more microcontrollers, each microcontroller synchronizing the third stage of its respective inverter with a sync signal sent over the bus, wherein the third stages of the two more inverters are coupled in series to provide a load output voltage, wherein each of the two or more microcontrollers read information from a respective sensor that determines a loss of the panel voltage of the respective solar panel of an affected microcontroller, the affected microcontroller operable to signal to others of the two or more microcontrollers via the bus to increase their load voltages to compensate for the loss of the panel voltage.

9. The system of claim 8, wherein one of the two or more microcontrollers is operable as a primary controller that generates the sync signal, others of the two more microcontrollers receiving the sync signal and using it to synchronize the third stages of the dedicated inverters of the other microcontrollers.

10. The system of claim 9, wherein the other microcontrollers monitor the sync signal, and if no sync signal is detected for a predetermined amount of time, one of the other microcontrollers operates as the primary controller.

11. The system of claim 9, wherein the two or more microcontrollers are chained to forward the sync signal to each other via the bus.

12. The system of claim 9, wherein the bus comprises an arbitrated digital messaging bus.

13. The system of claim 8, wherein the third stage of the inverters comprise an inductor and two activated power MOSFETS in series with the load that allow current to flow through the third stage in response to the loss of the panel voltage of the dedicated solar panel.

14. The system of claim 8, wherein the two or more microcontrollers comprise four microcontrollers, the two or more solar panels comprise four solar panels, and the two or more inverters comprise four inverters in series, wherein the load voltage is nominally about 28 VAC and the load output voltage is nominally 110 VAC.

15. The system of claim 14, wherein each of the four microcontrollers comprise sensors that measure the panel voltage and the load voltage of the dedicated inverter and the dedicated solar panel, the four microcontrollers each operable to determine a loss of the panel voltage of the dedicated solar panel and signal to others of the four microcontrollers to increase their load voltages to nominally 36 VAC to compensate.

16. The system of claim 8, wherein the second stages of the two or more inverters comprise high-frequency isolation transformers.

17. The power conversion circuit of claim 1, wherein the microcontroller reads the information from sensors via an analog to digital converter (ADC).

18. The power conversion circuit of claim 1, wherein the microcontroller controls the first stage via pulse width modulation (PWM) inputs to transistors of the first stage.

19. The system of claim 8, wherein when a fault condition is detected in one of the two or more microcontrollers, an external hardware trigger halts the one microcontroller and sends a signal to the others of the two or more microcontrollers to halt via respective hardware triggers.

* * * * *